(12) United States Patent
Pearce et al.

(10) Patent No.: US 10,443,883 B2
(45) Date of Patent: *Oct. 15, 2019

(54) VENT APPARATUS FOR ELECTRICAL ENCLOSURE

(71) Applicant: EATON CORPORATION, Cleveland, OH (US)

(72) Inventors: Michael Davis Pearce, Plum Branch, SC (US); Bryan Richard Benson, Chappells, SC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 153 days.

This patent is subject to a terminal disclaimer.

(21) Appl. No.: 15/456,664

(22) Filed: Mar. 13, 2017

(65) Prior Publication Data

US 2017/0343234 A1 Nov. 30, 2017

Related U.S. Application Data

(63) Continuation of application No. 14/078,654, filed on Nov. 13, 2013, now Pat. No. 9,593,863.

(51) Int. Cl.
*F24F 13/08* (2006.01)
*H02B 13/025* (2006.01)

(52) U.S. Cl.
CPC ........... *F24F 13/08* (2013.01); *H02B 13/025* (2013.01)

(58) Field of Classification Search
CPC ............................... F24F 13/08; H02B 13/025

USPC ........ 484/184, 255, 340, 358, 359, 360, 363
See application file for complete search history.

(56) References Cited

U.S. PATENT DOCUMENTS

| | | | | |
|---|---|---|---|---|
| 4,180,177 A | * | 12/1979 | Gunderman | A62C 3/00 220/230 |
| 5,193,049 A | * | 3/1993 | Jackson | H02B 13/025 361/676 |
| 5,710,402 A | * | 1/1998 | Karnbach | H02B 13/025 218/157 |
| 6,407,331 B1 | * | 6/2002 | Smith | H02B 13/025 174/17 VA |
| 2009/0185333 A1 | * | 7/2009 | Coomer | H02B 13/025 361/622 |

* cited by examiner

*Primary Examiner* — Gregory L Huson
*Assistant Examiner* — Dana K Tighe
(74) *Attorney, Agent, or Firm* — Eckert Seamans Cherin & Mellott, LLC

(57) ABSTRACT

An improved vent apparatus that is usable with an electrical enclosure includes a vent flap that is movable between a closed position overlying an opening formed in a wall of the electrical enclosure and an open position wherein at least a portion of the vent flap is spaced from the wall. The vent flap may be held in place in the closed position via gravity or through the use of a retainer such as a spring or a frangible structure. The vent flap is a part of a flap apparatus that is formed as a unitary single piece element that may be stamped from sheet metal, for example, and the flap apparatus includes a number of hinge elements that are rollably disposed on an edge of the wall adjacent the opening.

20 Claims, 6 Drawing Sheets

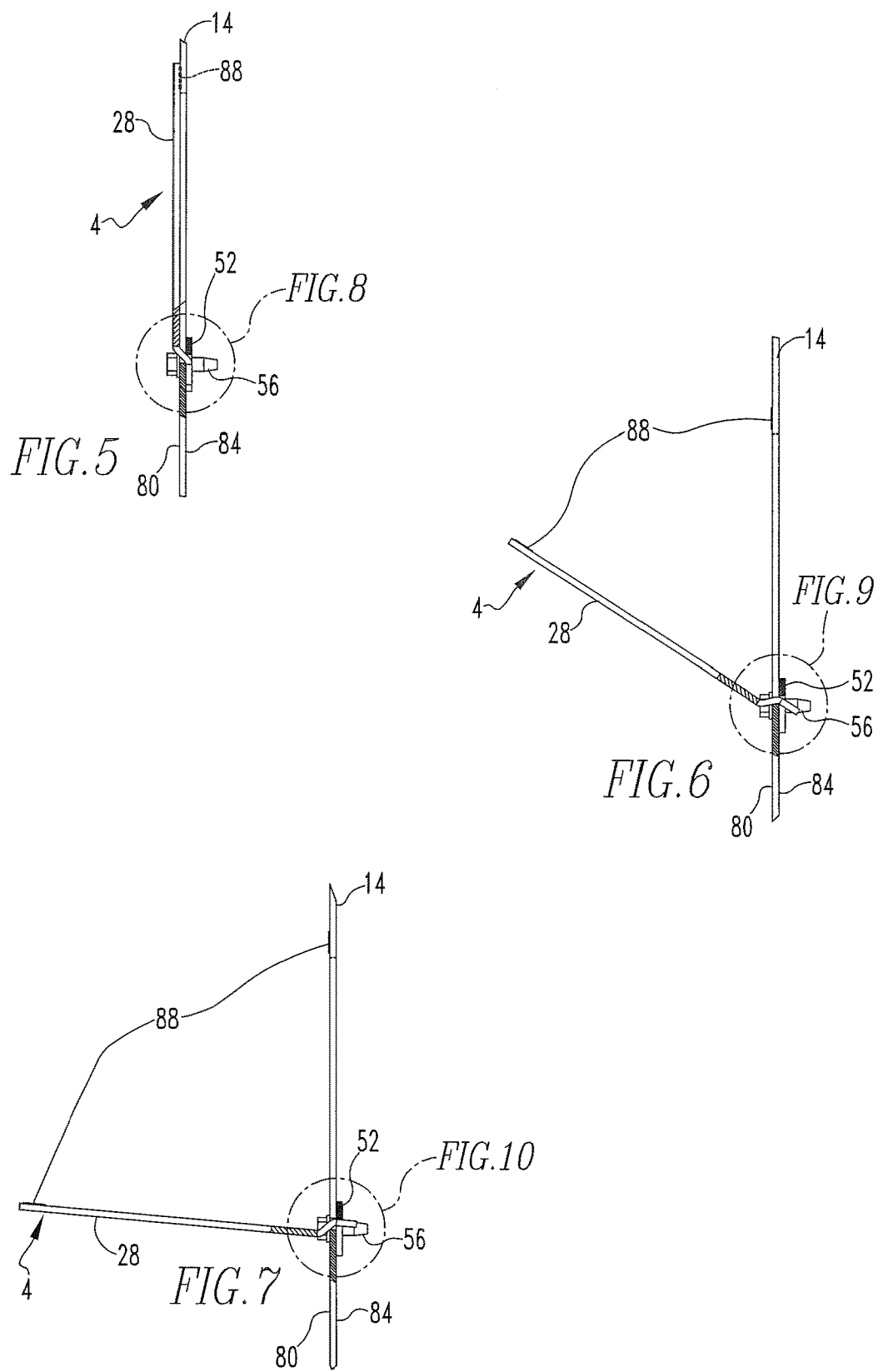

VENT APPARATUS FOR ELECTRICAL ENCLOSURE

CROSS REFERENCE TO RELATED APPLICATION

The instant application is a continuation of and claims priority from U.S. patent application Ser. No. 14/078,654, filed Nov. 13, 2013, now U.S. Pat. No. 9,593,863, the disclosures of which are incorporated herein by reference.

BACKGROUND

Field

The disclosed and claimed concept relates generally to electrical interruption equipment and, more particularly, to a vent apparatus that is operable to vent gases that are generated within an interior of an electrical enclosure, due to an arc event, to an adjacent compartment or to the exterior of the electrical enclosure for pressure relief.

Related Art

Electrical interruption equipment is generally understood. Electrical interruption equipment typically is usable to open a protected portion of a circuit in certain predefined overcurrent conditions, under-voltage conditions, and other conditions. Such electrical interruption equipment may include a circuit interrupter such as a vacuum circuit breaker, switch, or other such device. Depending upon the particular application, the circuit breaker or other circuit interrupter may be situated within a metallic enclosure.

Many circuit interrupters, primarily circuit breakers, include a set of separable contacts which are separable to interrupt current flowing therethrough. Such separation of the contacts is typically accompanied by an electrical arc that forms between the contacts and which is desirably extinguished as soon as possible. The circuit interrupter is designed in a way to minimize the amount of arc when used as intended. Such an arc or arc event can general gases that include a high temperature plasma and which are preferably dissipated as soon as possible.

Difficulty has been experienced, however, in applications wherein circuit interruption equipment is retained within an interior of an electrical enclosure such as is typically formed of sheet metal. Such electrical enclosures are intended to isolate the electrical interruption equipment and the associated conductors within its interior and therefore desirably does not include significant holes or other openings through which arc gases can easily flow. Moreover, a plurality of such electrical enclosures may be physically connected together, and the gases that may be generated due to an arc event from a circuit interrupter in one electrical enclosure are desirably not transferred into an adjacent electrical enclosure having another circuit interrupter situated therein. However, it is important to vent the arc gasses and pressure from within the metallic enclosure to other compartments within the enclosure or to the exterior of the enclosure as soon as possible and with as little resistance as possible. By improving the speed that the arc gasses and pressure can be released, pressure buildup and thus damage to the electrical equipment is minimized. Improvements are therefore desirable.

SUMMARY

An improved vent apparatus that is usable with an electrical enclosure includes a vent flap that is movable between a closed position overlying an opening formed in a wall of the electrical enclosure and an open position wherein at least a portion of the vent flap is spaced from the wall. The vent flap may be held in place in the closed position via gravity or through the use of a retainer such as a spring or a frangible structure. The vent flap is a part of a flap apparatus that is formed as a unitary single piece element that may be stamped from sheet metal, for example, and the flap apparatus includes a number of hinge elements that are rollably disposed on an edge of the wall adjacent the opening.

Accordingly, an aspect of the disclosed and claimed concept is to provide an improved vent apparatus which, in a closed position thereof, is configured to overlie at least a portion of an opening formed in a wall of an electrical enclosure, and that is structured to be movable to an open position as a result of an arc event within the interior of the electrical enclosure to permit the gases that result from the arc event to flow through the opening to an adjacent compartment or to the exterior of the electrical enclosure.

Another aspect of the disclosed and claimed concept is to provide an improved electrical enclosure apparatus that includes such a vent apparatus.

Accordingly, an aspect of the disclosed and claimed concept is to provide an improved vent apparatus for use in venting through an opening that is formed in a wall of an electrical enclosure gases generated within an interior of the electrical enclosure due to an arc event. The vent apparatus can be generally stated as including a flap apparatus structured to be situated on the wall and to be movable between a first position and a second position, and the general nature of which can be stated as including a number of hinge elements being structured to extend through the opening, a vent flap connected with an end of the number of hinge elements, the vent flap being structured to be in a closed position engaged with a first surface of the wall and overlying at least a portion of the opening in the first position of the flap apparatus, the vent flap being structured to be in an open position with at least a portion of the vent flap being spaced from the first surface in the second position of the flap apparatus, and a number of abutment elements connected with the number of hinge elements at another end thereof opposite the vent flap and being structured to be situated generally adjacent a second surface of the wall opposite the first surface. The vent apparatus can be generally stated as including a retention apparatus structured to be mounted to the wall and to retain the flap apparatus situated on the wall, the retention apparatus comprising a plate that is structured to be affixed to the second surface of the wall adjacent the opening and that is structured to be engageable by the number of abutment elements in the second position of the flap apparatus.

BRIEF DESCRIPTION OF THE DRAWINGS

A further understanding to the disclosed and claimed concept can be gained from the following Description when read in conjunction with the accompanying drawings in which:

FIG. 5 is a sectional view as taken along line 5-5 of FIG. 4;

FIG. 6 is a view similar to FIG. 5, except depicting the vent apparatus in a partially open position;

FIG. 7 is a view similar to FIG. 6, except depicting the vent apparatus in an open position;

Similar numerals refer to similar parts throughout the specification.

DESCRIPTION

Figure 1:
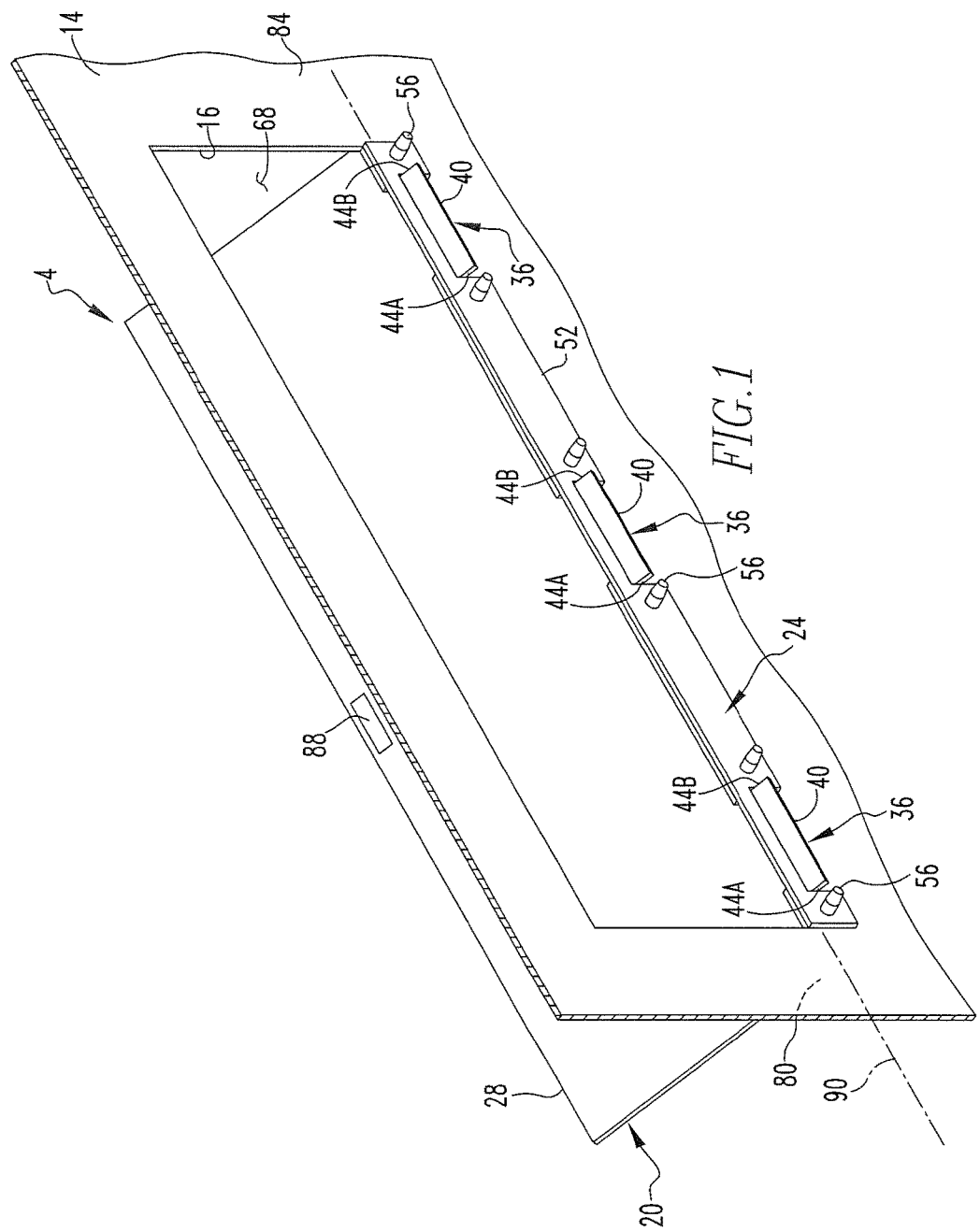
FIG. 1 is a perspective view of an improved vent apparatus in accordance with the disclosed and claimed concept.
Figure 2:
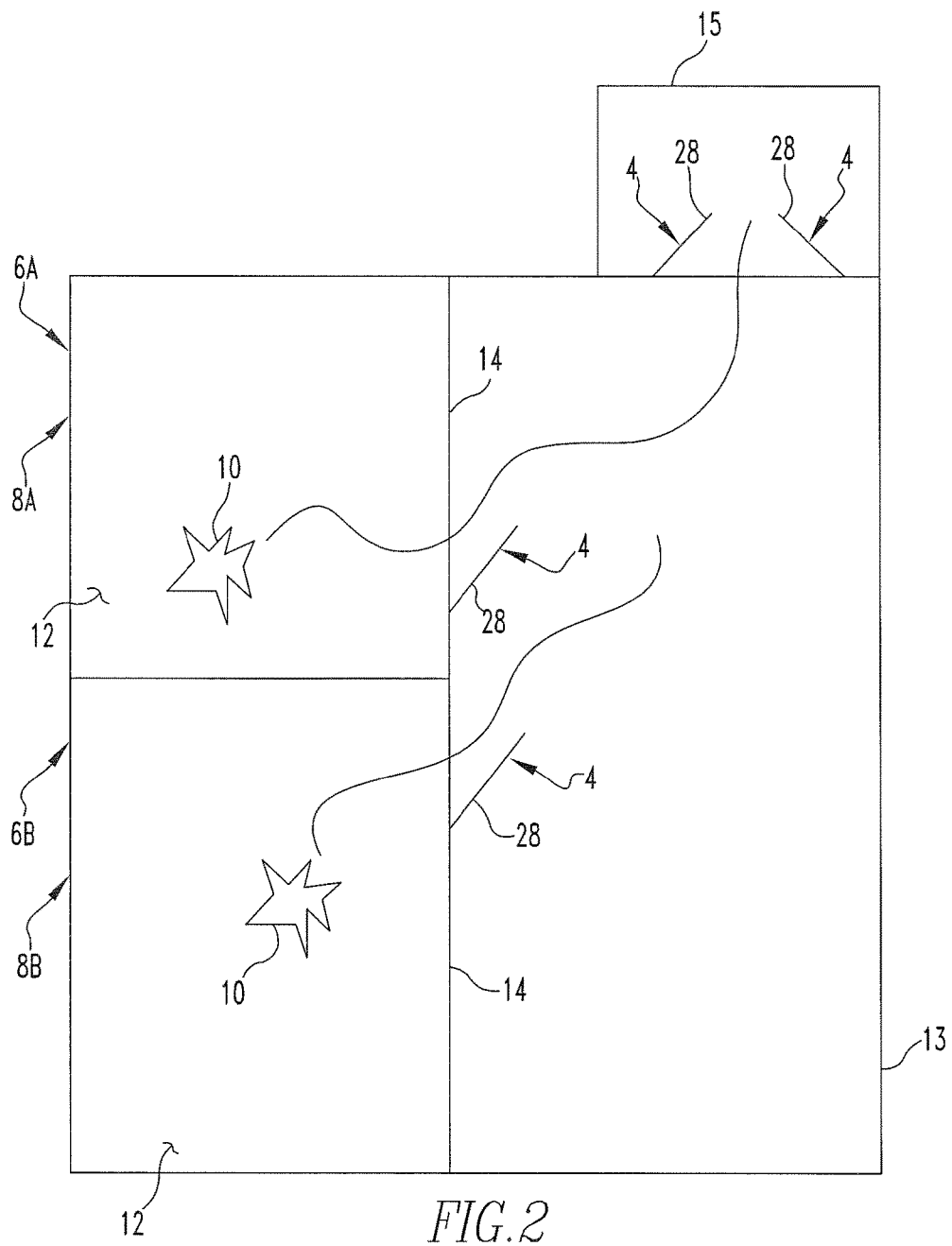
FIG. 2 is a schematic depiction of an improved electrical enclosure apparatus that includes several electrical compartments and several instances of the vent apparatus of FIG. 1.

An improved vent apparatus 4 is depicted generally in FIGS. 1-10. The vent apparatus 4 is usable on an electrical enclosure such as is schematically indicated in FIG. 2. More specifically, FIG. 2 depicts a pair of electrical compartments that are indicated at the numerals 6A and 6B, which are collectively or individually referred to herein with the numeral 6. The vent apparatus 4 in combination with the electrical compartments 6 can be said to form a pair of electrical compartment apparatuses 8A and 8B that are collectively or individually referred to herein with the numeral 8. That is, the improved vent apparatus 4 can be provided on a new electrical enclosure apparatus 8, or the vent apparatus 4 can be retrofitted to an existing electrical enclosure 6 to form an improved electrical enclosure apparatus 8 in accordance with the disclosed and claimed concept.

The vent apparatuses 4 depicted generally in FIG. 2 are each in their open position as result of a schematically depicted arc event 10 and are further depicted in a schematic fashion as dissipating gases due to the arc event 10 from an interior region 12 of the electrical enclosure apparatus 8 to the exterior thereof. In FIG. 2, two vent apparatuses 4 vent the gases from the electrical enclosure apparatuses 8A and 8B into an intermediate enclosure 13, and another two of the vent apparatuses 4 vent the gases from the interior of the intermediate enclosure 13 to a terminal enclosure 15 that is in fluid communication with the atmosphere at the exterior thereof. Numerous other configurations of electrical enclosures are possible and are usable in conjunction with the improved vent apparatus 4.

Each electrical enclosure 6 includes a wall 14 that is of a plate-like configuration and is typically made of sheet metal. The wall 14 has formed therein an opening 16, such as is depicted generally in FIG. 1. It can be seen from FIG. 3 that the opening 16 that is formed in the wall 14 can be said to include a main opening 68 and plurality of seats 72 that are of a notch-like configuration and each have a seat base 76. When the vent apparatus 4 is in an open position, as is depicted generally in FIG. 1, gases from within the interior 12 of the electrical enclosure apparatus 8 can flow through the opening 16 and thereby be vented to the exterior of the electrical enclosure apparatus 8.

Figure 3:
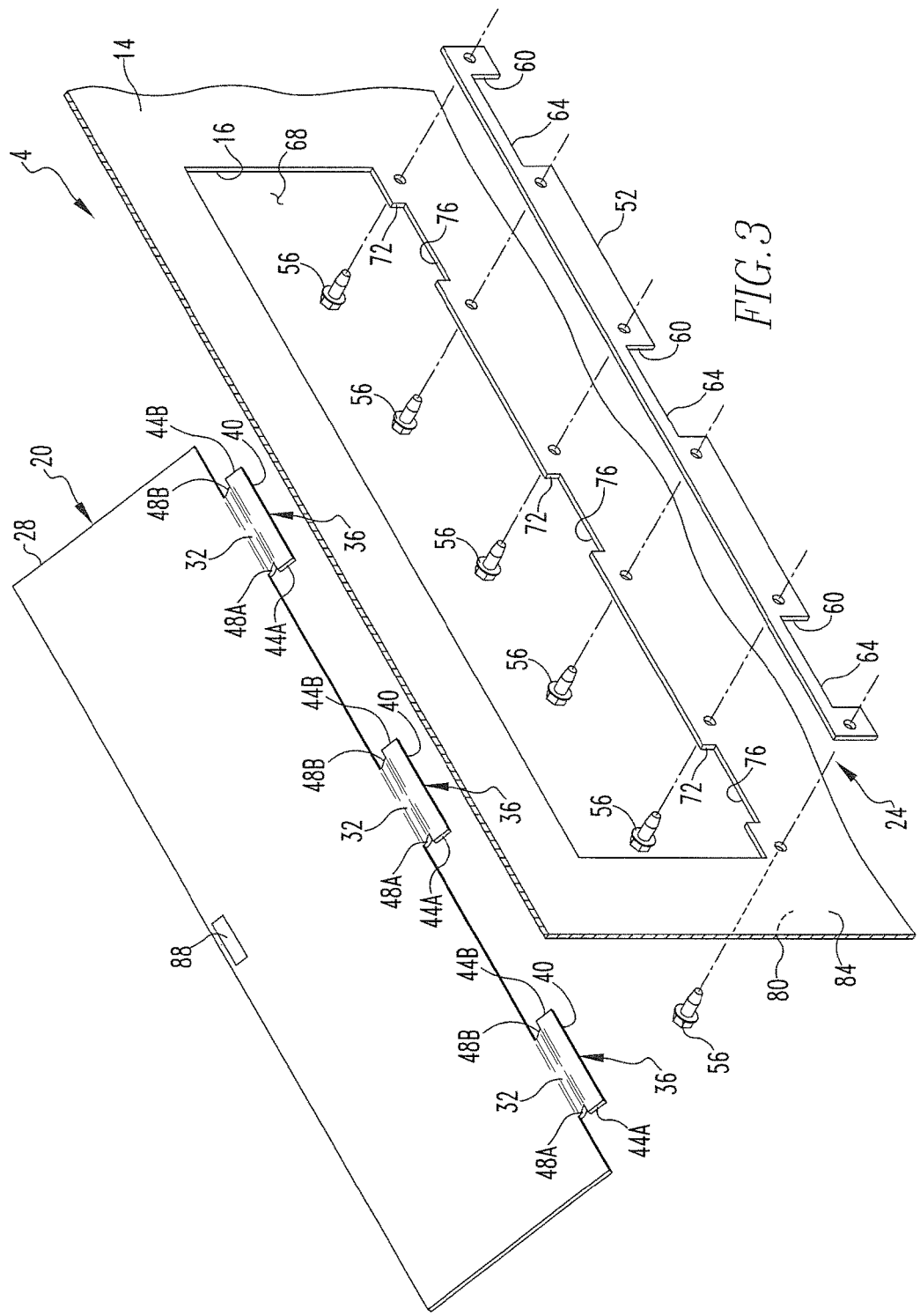
FIG. 3 is an exploded view of the vent apparatus of FIG. 1.

As can be understood from FIGS. 1 and 3, the vent apparatus 4 can be said to include a flap apparatus 20 and a retention apparatus 24. The flap apparatus 20 can be seen to be a unitary and co-formed single piece member such as may be formed from stamping a piece of sheet metal in the shape depicted generally herein. The flap apparatus 20 can be said to include a vent flap 28, a number of hinge elements 32, and a number of abutment elements 36. As employed herein, the expression "a number of" and variations thereof shall refer broadly to any non-zero quantity, including a quantity of one. The vent flap 28 is of a generally plate-like and planar configuration and is situated at an end of each of the hinge elements 32. The abutment elements 36 are of a plate-like configuration and are disposed at another end of the hinge elements 32 opposite the vent flap 28. As can be understood from FIGS. 8-10, the flap apparatus 20 includes a plurality of bends formed therein whereby the hinge elements 32 and the abutment elements 36 are formed and positioned in relation to one another and to the vent flap 28.

In the depicted exemplary embodiment, the abutment elements 36 each can be said to include a support 40 that is connected with the hinge element 32 at the end thereof opposite the vent flap 28, and can be said to further include a pair of lugs 44A and 44B that extend away from the support 40 in opposite directions therefrom. The lugs 44A and 44B can each be seen to protrude beyond the associated hinge element 36 such that a pair of indentations 48A and 48B are formed between the vent flap 28 and the lugs 44A and 44B. The indentations 48A and 48B are situated at opposite sides of the associated hinge element 32 whereby the hinge element 32 can be said to be generally interposed between the indentations 48A and 48B.

The retention apparatus 24 can be said to include a plate 52 and a plurality of fasteners 56 that are receivable in cooperating holes that are formed in the wall 14 and in the plate 52 to affix the plate 52 to the wall 14. The exemplary plate 52 that is depicted herein includes a plurality of notches 60 that are formed therein and that each include a notch base 64. The plate 52 can be formed from any of a variety of materials, such as the same type of metal from which the wall 14 is formed, from a sheet of plastic or other polymeric material, or other appropriate material.

As can further be understood from FIGS. 1 and 3, the vent apparatus 4 is installed on the wall 14 by receiving the hinge elements 32 on the seat bases 76, it being noted that such seat bases 76 can also be said to be edges of the wall 14 that are adjacent the opening 16. The plate 52 is then affixed to an interior surface 84 of the wall 14 with the use of the fasteners 56 that are received in the associated holes formed in the wall 14 and in the plate 52. When the plate 52 is affixed to the wall 14, as is depicted generally in FIGS. 1 and 4, the hinge elements 32 can be said to extend through a set of hingeable openings 86 that can each be said to be formed between the notch bases 64 and the seat bases 76. That is, the hinge elements 32 are retained generally between the wall 14 and the plate 52. The lugs 44A and 44B impart to the abutment elements 36 a maximum dimension that is greater than the width of the notches 16, whereby the lugs 44A and 44B resist the hinge elements 32 from being removed from the hingeable openings 86.

Figure 4:
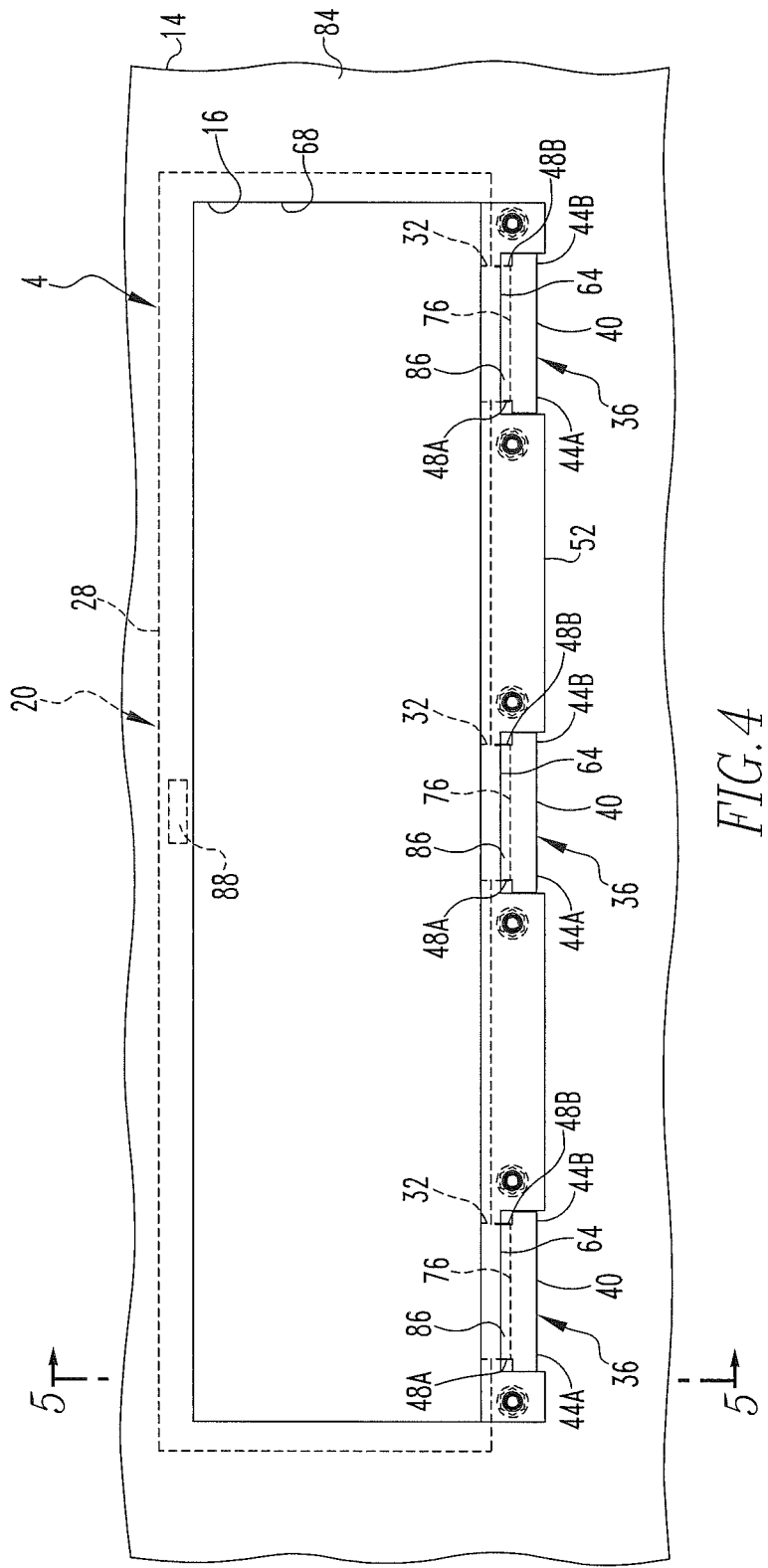
FIG. 4 is a front elevational view of the vent apparatus of FIG. 1 in a closed position as shown from an interior of one of the electrical enclosures of FIG. 2.

When the vent apparatus 4 is in a closed position, as is depicted generally in FIG. 4, the vent flap 28 overlies the main opening 68 of the opening 16 and can be retained in such closed position by any type of retainers or holding devices, such as a spring that would hold the vent flap 28 in the closed position or, by way of further example, a frangible structure 88 such as a bit of adhesive that is situated between a portion of an exterior surface 80 of the wall 14 and a surface of the vent flap 28. The adhesive that makes up the frangible structure 88 that is depicted in an exemplary fashion herein is a low strength adhesive that is easily fractured or broken to easily permit the vent flap 28 to move from the closed position of FIG. 4 to the open position of FIG. 1 whenever the pressure of the gases due to the arc event 10 that are applied to the vent flap 28 reach a predetermined pressure value. Any type of appropriate adhesive can be employed, including polymeric adhesives, wax-like materials, and the like without limitation. Likewise, other frangible structures such as glass or ceramic structures that are configured to break when the pressure of the gases from the arc event 10 applied to the vent flap 28 reaches a predetermined level. Still alternatively, the vent flap 28 can be held in the closed position by gravity, such as is possible if the vent apparatuses 4 are oriented in a fashion depicted herein for those vent apparatuses 4 that are situated between the intermediate and terminal enclosures 13 and 15, it being assumed that the upward direction in FIG. 2 is the vertical direction. Alternatively, the vent flap 28 can be held in the closed position by gravity if the two vent apparatuses that are depicted in FIG. 2 as being situated between the electrical enclosure apparatus 8 and the intermediate enclosure 13 were in an upside-down configuration from that depicted in FIG. 2, i.e., an upside-down position from that depicted generally in FIG. 4.

When the pressure within the interior 12 of the electrical enclosure apparatus 8 reaches a predetermined level due to the occurrence of the arc event 10 within the interior region 12 thereof, the gas pressure applied to the vent flap 28 causes the frangible structure 88 to be broken, or it causes whatever other apparatus that maintains the vent flap 28 in its closed position to be overcome. The vent flap 28 is then free to move and thus moves from the closed position depicted generally in FIG. 5, through the partially open position of FIG. 6, and then to the open position depicted generally in FIG. 7. In moving among the positions depicted generally in FIGS. 5, 6, and 7, the flap apparatus 20 can be said to generally pivot along a movement axis 90 which can be seen in FIGS. 1 and 4 and which is oriented generally parallel with the planar extent of the wall 14. It is understood, however, that the movement axis 90 is depicted herein in a representative fashion since the flap apparatus 20 generally rolls and translates along the seat bases 76 between the closed and open positions rather than pivoting about a fixed axis. As such, the movement axis 90 is intended to depict an instantaneous pivoting of the flap apparatus 20 at a given instant in time during movement between the closed and open positions rather than depicting an axis about which the flap apparatus 20 pivots during the entirety of its movement between the closed and open positions.

Figure 8:
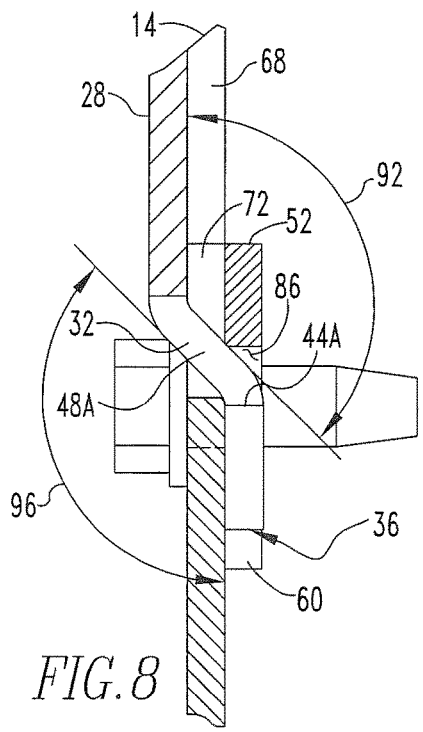
FIG. 8 is an enlarged view of the indicated portion of FIG. 5.
Figure 9:
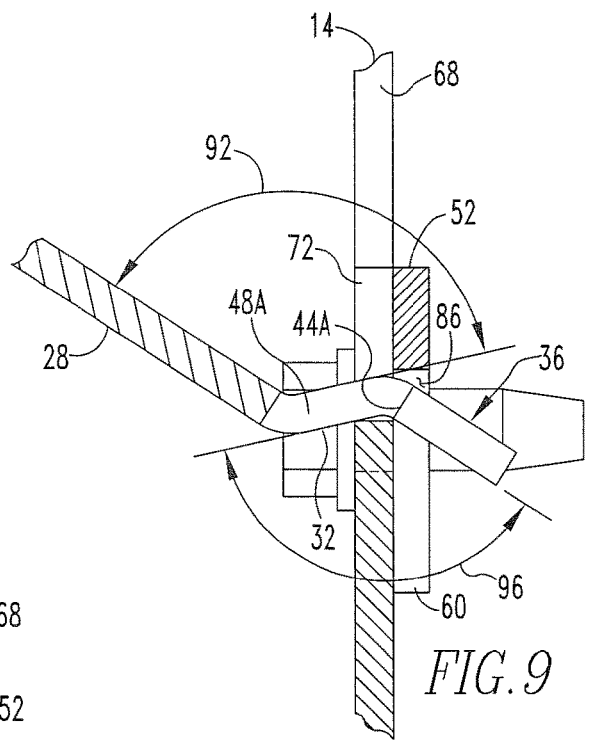
FIG. 9 is an enlarged view of the indicated portion of FIG. 6.
Figure 10:
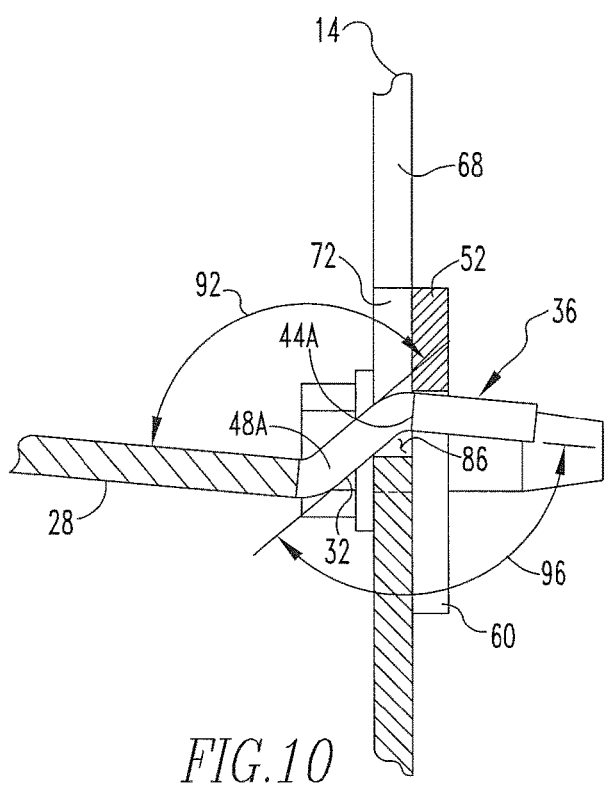
FIG. 10 is an enlarged view of the indicated portion of FIG. 7.

As can be understood from FIGS. 8-10, the vent flap 24 and the hinge elements 32 are oriented at an oblique angle 92 with respect to one another. As employed herein, the expression "oblique" and variations thereof shall refer to a relationship that is neither parallel nor perpendicular. Moreover, the hinge elements 32 and the abutment elements 36 can be said to be oriented at another oblique angle 96 with respect to one another. In the depicted exemplary embodiment, the angles 92 and 96 are substantially equal, whereby the vent flap 28 and the abutment elements 36 are generally parallel and spaced apart from one another, i.e., offset from one another by substantially the thickness of the wall 14.

As can be understood from FIGS. 8-10, the vent flap 28 in its closed position is disposed on the exterior surface 80 of the wall 14, and the abutment elements 36 are situated on the interior surface 84 of the wall 14. Once the vent flap 28 has moved away from the closed position of FIG. 8 in a direction generally toward the open position, the vent flap 28 is generally spaced from the exterior surface 80, with the distal portion of the vent flap 28 being situated farther away from the exterior surface 80 than the proximate portion of the vent flap 28 that is situated adjacent the hinge elements 32. In the open position of the vent flap 28 which is depicted generally in FIG. 10, the lugs 44A and 44B engage the wall 14 in regions peripheral to the seats 72 to retain the hinge elements 32 within the hingeable openings 86.

Once the gases from the arc event 10 have dissipated sufficiently, the vent apparatus 4 can be manually moved from the open position of FIG. 10 back to the closed position of FIG. 8, and a new frangible structure can be installed to retain the vent flap 28 in its closed position. Alternatively, if the retainer that held the vent flap 28 in its closed position was, for instance, a spring, the spring might itself bias the vent flap 28 back to its closed position. Still alternatively, if the vent flap 28 is retained in its closed position by gravity, gravity will likely automatically return the vent flap 28 to its closed position after the arc gases have sufficiently dissipated.

From the foregoing, it can be understood that the improved vent apparatus 4 provides to the resultant electrical enclosure apparatus 8 an inexpensive device that reliably vents arc gases out of an electrical enclosure 6. The vent apparatus 4 consists primarily of a stamped piece of sheet metal and a plate 52 that is affixed to the wall 14 of the electrical enclosure 6 with ordinary fasteners 56 and which retains the flap apparatus 20 in a position mounted on the wall 14. As such, the improved vent apparatus 4 provides a venting alternative that does not rely upon conventional hinges with pins to provide reliable venting of an electrical enclosure 6 in the event of an arc within the interior thereof.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A vent apparatus for use in venting gases through an opening that is formed in a wall of an electrical enclosure, the vent apparatus comprising:
    a flap apparatus structured to be situated on the wall and to be movable between a first position and a second position and comprising:
        a number of hinge elements being structured to extend through the opening,
        a vent flap connected with an end of the number of hinge elements, the vent flap being structured to be in a closed position engaged with a first surface of the wall and overlying at least a portion of the opening in the first position of the flap apparatus, the vent flap being structured to be in an open position with at least a portion of the vent flap being spaced from the first surface in the second position of the flap apparatus, and
        a number of abutment elements connected with the number of hinge elements at another end thereof opposite the vent flap and being structured to be situated generally adjacent a second surface of the wall opposite the first surface; and
    a retention apparatus structured to be mounted to the wall and to retain the flap apparatus situated on the wall.

2. The vent apparatus of claim 1 wherein flap apparatus is generally pivotable about a movement axis between the closed and open positions the movement axis being oriented generally parallel with the wall.

3. The vent apparatus of claim 2 wherein at least a first abutment element of the number of abutment elements comprises a support that is connected to a hinge element of the number of hinge elements and further comprises a lug that is connected with the support, the lug extending from the support and protruding beyond the hinge in a direction generally along the movement axis.

4. The vent apparatus of claim 3 wherein the at least first abutment element further comprises another lug that is connected with the support, the lug and the another lug extending from the support in opposite directions.

5. The vent apparatus of claim 4 wherein the flap apparatus further comprises a pair of indentations situated at opposite sides of the hinge element, a first indentation of the pair of indentations being interposed between the vent flap and the lug, and a second indentation of the pair of indentations being interposed between the vent flap and the another lug.

6. A vent apparatus for use in venting gases through an opening that is formed in a wall of an electrical enclosure, the vent apparatus comprising:
 a flap apparatus structured to be situated on the wall and to be movable between a first position and a second position and comprising:
  a number of hinge elements being structured to extend through the opening, and
  a vent flap connected with an end of the number of hinge elements, the vent flap being structured to be in a closed position engaged with a surface of the wall and overlying at least a portion of the opening in the first position of the flap apparatus, the vent flap being structured to be in an open position with at least a portion of the vent flap being spaced from the surface in the second position of the flap apparatus; and
 a retention apparatus structured to be mounted to the wall and to retain the flap apparatus situated on the wall, the retention apparatus comprising a retainer that is structured to be connected with the flap apparatus and that is structured to resist movement of the vent flap away from its closed position in the absence of an arc event and that is structured to permit movement of the vent flap away from its closed position during the arc event.

7. The vent apparatus of claim 6 wherein the retainer comprises at least one of a spring, a frangible structure, and an adhesive which, when gases from the arc event raise the pressure within an interior of the electrical enclosure to a predetermined level, is structured to deform or fracture or both and to thereby permit movement of the vent flap away from its closed position.

8. The vent apparatus of claim 6 wherein the flap apparatus further comprises a number of abutment elements connected with the number of hinge elements at another end thereof opposite the vent flap and structured to be situated generally adjacent another surface of the wall opposite the surface.

9. The vent apparatus of claim 8 wherein the vent flap is structured to be engaged with an exterior surface of the wall in the closed position and wherein the number of abutment elements are structured to be situated generally adjacent an interior surface of the wall opposite the exterior surface.

10. The vent apparatus of claim 8 wherein the retention apparatus comprises a plate that is structured to be affixed to the another surface of the wall adjacent the opening and that is structured to be engageable by the number of abutment elements in the second position of the flap apparatus.

11. The vent apparatus of claim 10 wherein the plate has a number of notches formed therein the number of abutment elements being received in the number of notches in the first position of the flap apparatus.

12. The vent apparatus of claim 6 wherein the flap apparatus is structured to be retained by gravity in the first position situated on the wall.

13. The vent apparatus of claim 6 wherein the number of hinge elements are structured to be movably situated on an edge of the wall that is situated adjacent the opening.

14. A vent apparatus for use in venting gases through an opening that is formed in a wall of an electrical enclosure, the vent apparatus comprising:
 a flap apparatus structured to be situated on the wall and to be movable between a first position and a second position and comprising:
  a plurality of hinge elements being structured to extend through the opening,
  a vent flap connected with an end of the plurality of hinge elements, the vent flap being structured to be in a closed position engaged with a surface of the wall and overlying at least a portion of the opening in the first position of the flap apparatus, the vent flap being structured to be in an open position with at least a portion of the vent flap being spaced from the surface in the second position of the flap apparatus,
  the vent flap being of a generally planar and plate-like configuration, and
  the plurality of hinge elements each being of a generally plate-like configuration coplanar with one another and oriented oblique to the vent flap; and
 a retention apparatus structured to be mounted to the wall and to retain the flap apparatus situated on the wall.

15. The vent apparatus of claim 14 wherein the flap apparatus further comprises a number of abutment elements connected with the plurality of hinge elements at another end thereof opposite the vent flap and structured to be situated generally adjacent another surface of the wall opposite the surface.

16. The vent apparatus of claim 15 wherein the number of abutment elements are each of a generally plate-like configuration coplanar with one another and oriented oblique to the plurality of hinge elements.

17. The vent apparatus of claim 16 wherein the number of abutment elements are oriented generally parallel with and offset from the vent flap.

18. The vent apparatus of claim 14 wherein the vent flap is a unitary structure substantially es of joints and is formed from a sheet of material.

19. The vent apparatus of claim 14 wherein the flap apparatus is structured to be retained by gravity in the first position situated on the wall.

20. The vent apparatus of claim 14 wherein the plurality of hinge elements are structured to be movably situated on an edge of the wall that is situated adjacent the opening.

* * * * *